United States Patent
Yamamoto et al.

[11] Patent Number: 5,772,342
[45] Date of Patent: Jun. 30, 1998

[54] TAPE PRINTING APPARATUS CAPABLE OF INPUTTING AND PRINTING GRAPHICS

[75] Inventors: Yoshijiro Yamamoto, Toyokawa; Mitsumasa Kako, Tokai; Michifumi Ishigami, Nagoya, all of Japan

[73] Assignee: Brother Kogyo Kabushiki Kaisha, Nagoya, Japan

[21] Appl. No.: 514,094

[22] Filed: Aug. 11, 1995

[30] Foreign Application Priority Data

Sep. 6, 1994 [JP] Japan ................................. 6-239561

[51] Int. Cl.$^6$ ................................................ G06F 3/02
[52] U.S. Cl. ..................... 400/615.2; 400/586; 400/473; 395/326; 395/333; 395/358
[58] Field of Search ................................. 395/155, 156, 395/161, 159, 326, 333, 334, 358; 400/586, 83, 615.2, 473, 76; 382/9, 22, 41, 44

[56] References Cited

U.S. PATENT DOCUMENTS

| | | | |
|---|---|---|---|
| 5,287,417 | 2/1994 | Eller et al. ............................ | 382/41 |
| 5,344,247 | 9/1994 | Sakuragi et al. ...................... | 400/615.2 |
| 5,480,246 | 1/1996 | Morimoto ............................. | 400/615.2 |
| 5,500,935 | 3/1996 | Moran et al. ............................ | 395/156 |
| 5,503,482 | 4/1996 | Kawakami et al. ................. | 400/615.2 |

*Primary Examiner*—John S. Hilten
*Attorney, Agent, or Firm*—Oliff & Berridge

[57] ABSTRACT

After an input width setting mode has been entered by operating an input width set switch, an upper-end position and a lower-end position of an input width are set by an input pen to define an input width of an input width area for inputting a graphic into a drawing area. Further, drawing area coefficients $DAC_y$, for a transverse direction (Y-axis direction) of a tape, and $DAC_x$, for a longitudinal direction (X-axis direction), of the tape are determined based on data about the defined input width and data about the width of the tape. Coordinate data of the graphic input within the input width area are transformed into tape coordinates based on the determined drawing area coefficients. Thus, a tape printing apparatus for inputting the graphic is capable of freely setting an input width for each graphic input on the drawing area of the graphic input panel and printing the graphic on the tape under the best possible use of the tape width, by associating the defined input width with the tape width.

21 Claims, 17 Drawing Sheets

| S1 | TURN OFF DRAWING CURSOR |
|---|---|
| S2 | DISPLAY MESSAGE FOR FACILITATING INPUT OF UPPER-END POSITION OF INPUT WIDTH AREA |
| S3 | IS PEN WITHIN DRAWING AREA? |
| S4 | IS PEN SWITCHED ON? |
| S5 | DETERMINE AND STORE UPPER-END POSITION OF INPUT WIDTH AREA |
| S6 | DISPLAY MESSAGE FOR FACILITATING INPUT OF LOWER-END POSITION OF INPUT WIDTH AREA |
| S7 | IS PEN SWITCH OFF? |
| S8 | IS PEN SWITCH ON? |
| S9 | DETERMINE AND STORE LOWER-END POSITION OF INPUT WIDTH AREA |
| S10 | TURN OFF FACILITATION MESSAGE |
| S11 | DETERMINE DRAWING AREA COEFFICIENTS $DAC_x$ AND $DAC_y$ |
| S12 | IS PEN SWITCH OFF? |
| S13 | TURN ON AND DISPLAY DRAWING CURSOR |

Fig. 4B

| S1 | TURN OFF DRAWING CURSOR |
|---|---|
| S2 | DISPLAY MESSAGE FOR FACILITATING INPUT OF UPPER-END POSITION OF INPUT WIDTH AREA |
| S3 | IS PEN WITHIN DRAWING AREA? |
| S4 | IS PEN SWITCHED ON? |
| S5 | DETERMINE AND STORE UPPER-END POSITION OF INPUT WIDTH AREA |
| S6 | DISPLAY MESSAGE FOR FACILITATING INPUT OF LOWER-END POSITION OF INPUT WIDTH AREA |
| S7 | IS PEN SWITCH OFF? |
| S8 | IS PEN SWITCH ON? |
| S9 | DETERMINE AND STORE LOWER-END POSITION OF INPUT WIDTH AREA |
| S10 | TURN OFF FACILITATION MESSAGE |
| S11 | DETERMINE DRAWING AREA COEFFICIENTS $DAC_x$ AND $DAC_y$ |
| S12 | IS PEN SWITCH OFF? |
| S13 | TURN ON AND DISPLAY DRAWING CURSOR |

Fig.10

| PHASE PATTERN | SECOND PHOTOCOUPLERE | FIRST PHOTOCOUPLER |
|---|---|---|
| 0 | OFF | OFF |
| 1 | OFF | ON |
| 3 | ON | ON |
| 2 | ON | OFF |

Fig.11

| NEW PATTERN | PREVIOUS PATTERN | ADDED VALUE |
|---|---|---|
| 0 | 0 | 0 |
| 0 | 1 | -1 |
| 0 | 2 | +1 |
| 0 | 3 | 0 |
| 1 | 0 | +1 |
| 1 | 1 | 0 |
| 1 | 2 | 0 |
| 1 | 3 | -1 |
| 2 | 0 | -1 |
| 2 | 1 | 0 |
| 2 | 2 | 0 |
| 2 | 3 | +1 |
| 3 | 0 | 0 |
| 3 | 1 | +1 |
| 3 | 2 | -1 |
| 3 | 3 | 0 |

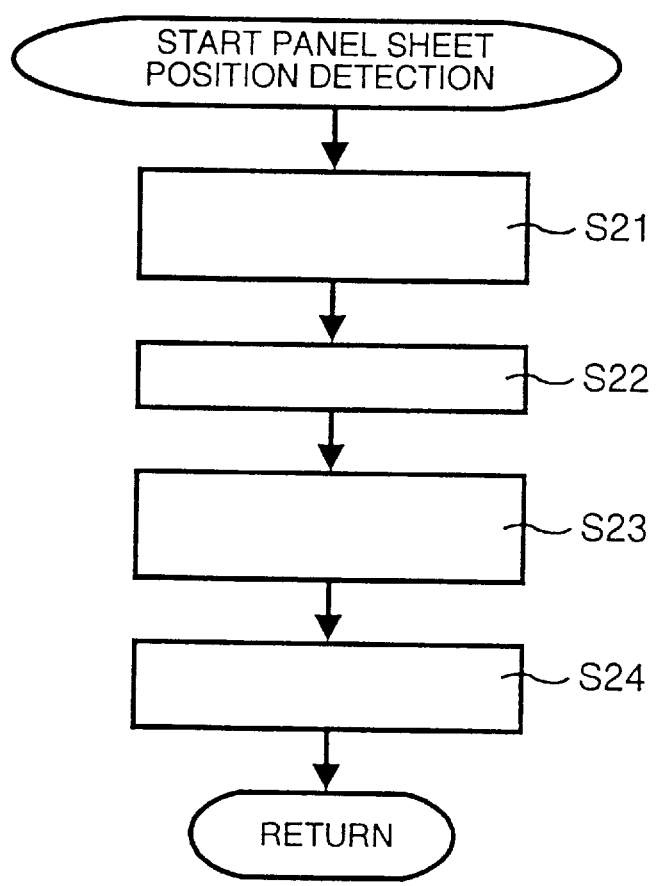

Fig. 12B

| S21 | INPUT ON AND OFF STATES OF FIRST AND SECOND PHOTOCOUPLERS AND DETERMINE THE PHASE PATTERN |
|---|---|
| S22 | STORE CURRENT AND PREVIOUS PHASE PATTERNS |
| S23 | DETERMINE ADDED VALUE FOR CURRENT AND PREVIOUS PHASE PATTERNS FROM ADDED VALUE TABLE |
| S24 | ADD DETERMINED ADDED VALUE TO TOTAL VALUE COUNTED BY POSITION COUNTER |

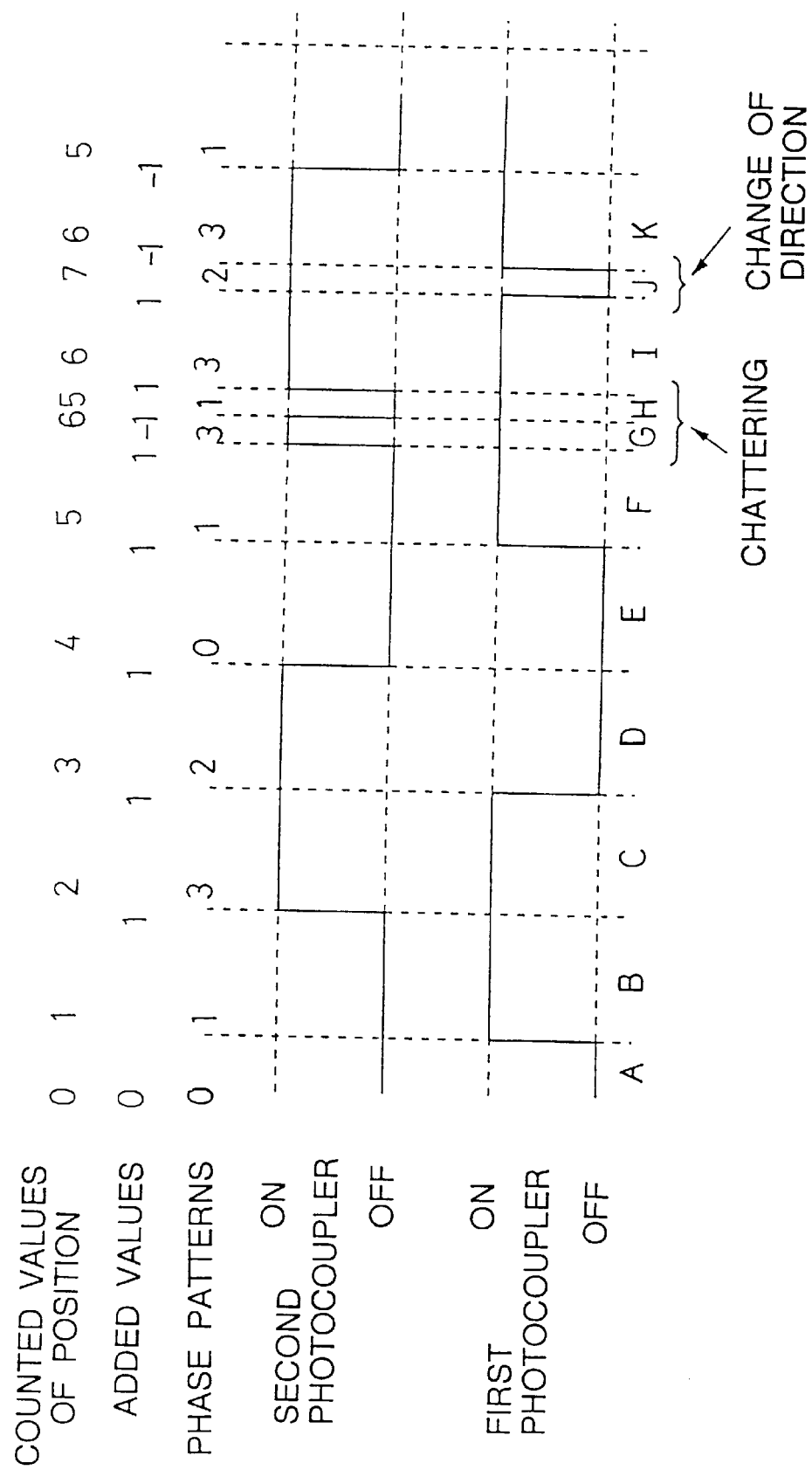

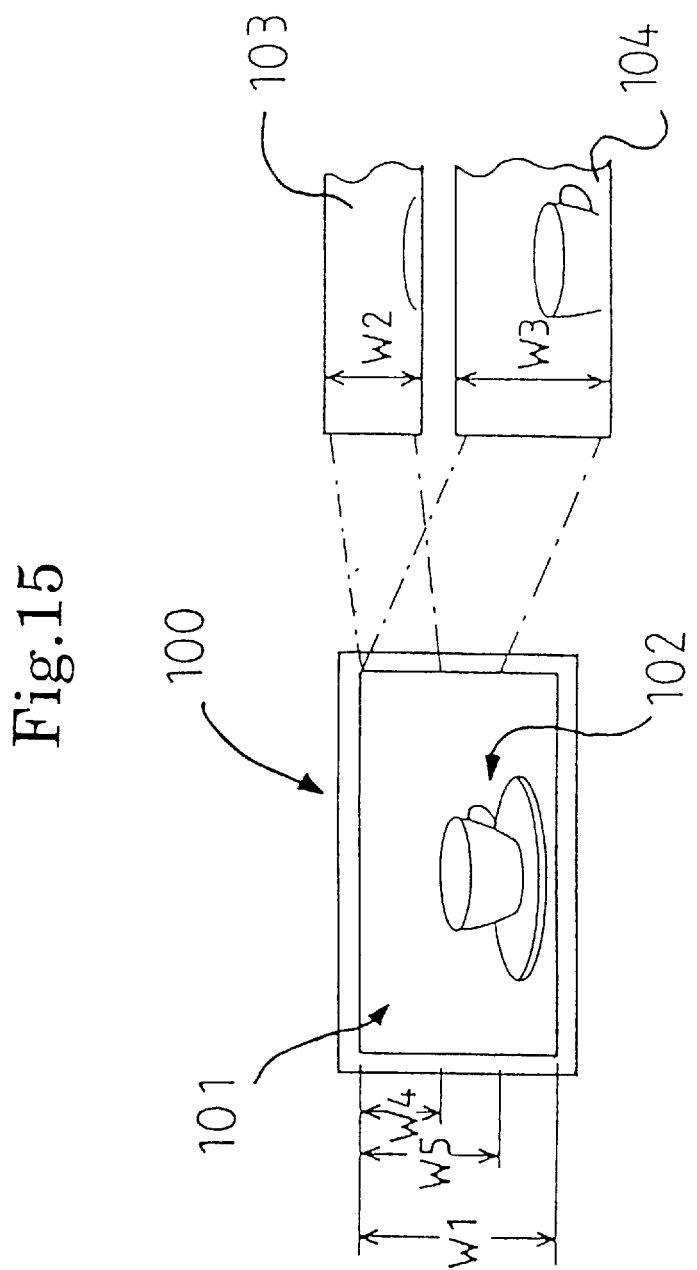

Fig. 16B

| S31 | CLEAR POSITION COUNTER AND CURRENT AND PREVIOUS PHASE PATTERN STORAGE LOCATIONS |
|---|---|
| S32 | INPUT INITIAL STATES OF FIRST AND SECOND PHOTOCOUPLERS |
| S33 | DETERMINE INITIAL PHASE PATTERN FOR INITIAL STATES OF FIRST AND SECOND PHOTOCOUPLERS FROM PHASE TABLE |
| S34 | STORE INITIAL PHASE PATTERN AS CURRENT PHASE PATTERN |
| S35 | CONTINUE MEASURING GRAPHICS INPUT SHEET PANEL MOVEMENT? |
| S36 | INPUT CURRENT STATES OF FIRST AND SECOND PHOTOCOUPLERS |
| S37 | DETERMINE NEW PHASE PATTERN FOR CURRENT STATES OF FIRST AND SECOND PHOTOCOUPLERS FROM PHASE TABLE |
| S38 | RESTORE CURRENT PHASE PATTERN AS PERVIOUS PHASE PATTERN, STORE NEW PHASE PATTERN AS CURRENT PHASE PATTERN |
| S39 | DETERMINE ADDED VALUE FOR CURRENT AND PREVIOUS PHASE PATTERNS FROM ADDED VALUE TABLE |
| S40 | ADD DETERMINED ADDED VALUE TO TOTAL VALUE COUNTED BY POSITION COUNTER |
| S41 | CONVERT TOTAL VALUE COUNTED BY POSITION COUNTER TO DISPLACEMENT VALUE |
| S42 | SET WIDTH OF INPUT WIDTH AREA TO DISPLACEMENT VALUE |

TAPE PRINTING APPARATUS CAPABLE OF INPUTTING AND PRINTING GRAPHICS

BACKGROUND OF THE INVENTION

1. Field of the Invention

This invention relates to a tape printing apparatus which is capable of inputting graphics drawn in a drawing area of a graphics input panel and printing the input graphics on an elongated tape while displaying the graphic on a display. Particularly, this invention is directed to a tape printing apparatus capable of freely setting an input range of a graphic input from the drawing area on the graphics input panel and printing the graphic on the tape under the best possible use of the width of the tape by associating the graphic input range with the tape width.

2. Description of the Related Art

It is known to input graphics into a general-purpose computer using a graphics-inputtable apparatus, such as a graphics tablet. In general, the graphics-inputtable apparatus has a graphics input panel having a predetermined drawing area for inputting a graphic, with a display of the computer used to display the input graphic. A printer which is connected to the computer is used to print the graphic. The graphic is input through the graphics input panel. The input graphic is then displayed on the display to confirm that it is correct. The input graphic is then printed by the printer. In the computer-associated graphics inputting apparatus, the size of the graphics-inputting apparatus is not relevant to the size of the sheet used by the printer. Once the graphic is input and stored, it can be freely scaled, rotated, and/or flipped. Additionally, the graphic can be incorporated into another graphic or a document. Furthermore, portions of the graphic can be cut from the graphic and used alone or pasted into another graphic.

However, in a device that does not have the processing power or memory resources of a general-purpose computer, such as a tape printing apparatus, if a graphics-inputting apparatus is attached to the tape printing apparatus, the size of the drawing area would be difficult to associate to the width of the tape. Additionally, since the tape can be of any one of a number of widths, it is insufficient to merely associate the size of the drawing area to any single tape width. Furthermore, it is difficult to provide a tape printing apparatus with the types of hardware and software used by the general-purpose computer to process the graphic without making the tape printing apparatus prohibitively expensive. Accordingly, an apparatus and method are needed for associating the size of the drawing area of a graphics-inputting apparatus for inputting graphics to the width of the tape on which the graphic is to be printed by a tape printing apparatus on an arbitrarily-wide tape.

SUMMARY OF THE INVENTION

This invention thus provides a graphics-inputtable tape printing apparatus capable of freely setting an input range or a partial width of an input width area for inputting a graphic drawn on the drawing area of the graphics input panel to a selected tape width and printing the graphic on a tape under the best possible use of the width of the tape, by associating the set input range with the width of the tape.

A first preferred embodiment of the graphic-inputtable tape printing apparatus of this invention, the graphics-inputtable tape printing apparatus includes a graphics input panel having a predetermined drawing area, a display for displaying a graphic input from the drawing area, a printer for printing the graphic on an elongated tape, and input range setting means for setting an input range of an input width area within which the graphic is input on the drawing area. The input range setting means associates the partial input width to the width of the tape. The input range setting means further determines an input upper-limit position and an input lower-limit position of the input width area within the drawing area corresponding to the partial input width.

A second preferred embodiment of the graphics inputtable tape printing apparatus includes, as the input range setting means, a plurality of detection holes provided on one side of the graphics input panel and arranged in a linear array or row, a moving mechanism for moving the graphics input panel in a horizontal direction, a pair of first and second detectors for successively detecting the detection holes while the graphics input panel is being displaced by the moving mechanism, and a counter for counting a travel distance of the graphics input panel according to a detected pattern corresponding to each of the detection states of the detection holes detected by the first and second detectors.

Thus, in the first and second preferred embodiments of the graphics-inputtable tape printing apparatus of this invention, when a desired graphic is input or drawn on the drawing area on the graphics input panel, the input range setting means sets or defines the input range of the input width area for inputting the graphic. At this time, the input range setting means determines the input upper-limit position and the input lower-limit position within the drawing area and associates the partial input width with the width of the tape. The input width may also be set by successively detecting with the pair of first and second detectors the plurality of detection holes provided on one side of the graphics input panel while the graphics input panel is moved in the horizontal direction by the moving mechanism, by counting the travel distance of the graphics input panel with the counter according to the detected pattern corresponding to each detected state of the detection holes.

Thus, the input width of each graphic can be associated with the width of the tape by mutually taking into consideration each of the widths of the various tapes usable in the tape printing apparatus and the size, type and the like of the graphic input or drawn on the drawing area on the graphics input panel.

Thereafter, the desired graphic input from the drawing area on the graphics input panel is displayed on the display and is printed on the lengthwise tape by the printer. Since, at this time, the input width of the graphic has been freely set to correspond to the width of the tape by the input range setting means, as described above, the graphic can be printed on the tape under the best possible use of the tape width.

These and other objects, features and advantages of this invention will become apparent from the following description and the appended claims, taken in conjunction with the accompanying drawings in which one preferred embodiment of this invention is shown.

BRIEF DESCRIPTION OF THE DRAWINGS

The invention will now be described with reference to the accompanying drawings, wherein:

FIG. 10 is a phase pattern table;

FIG. 11 is an added-values table;

FIGS. 12A and 12B are a flowchart outlining one preferred method for detecting the graphics input panel sheet position;

FIG. 13 shows the relationships between the signal status of the photoreceptors, the phase patterns, and the value of the counter;

FIG. 15 shows a second relationship between a drawing area and the tape width in the tape printing apparatus; and FIGS. 16A and 16B are a flowchart outlining in greater detail the method for detecting the graphics input panel sheet position of FIGS. 12A and 12B.

DETAILED DESCRIPTION OF THE PREFERRED EMBODIMENTS

Figure 14:
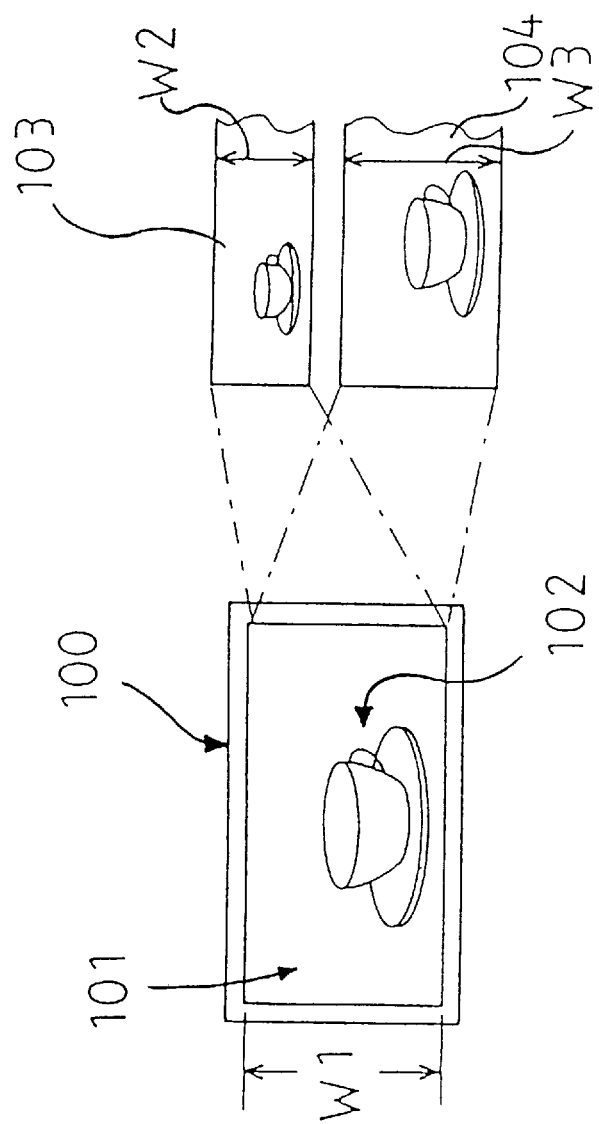
FIG. 14 shows a first relationship between a drawing area and the tape width in a tape printing apparatus.

Two relationships between the drawing area of the graphics input panel employed in a graphics-inputtable tape printing apparatus and the width of the tape on which the graphic is to be printed without using this invention are shown in FIGS. 14 and 15. FIG. 14 illustrates the relationship between a drawing area 101 having a width W1 of a graphics input panel 100 and the tape widths W2 and W3 of a narrow tape 103 and a wide tape 104, respectively. FIG. 15 shows the relationship between a drawing area 101 having a full width W1 and partial widths W4 and W5, and the tape widths W2 and W3 when the partial widths W4 and W5 correspond to the tape widths W2 and W3, respectively.

As shown in FIG. 14, the graphic input panel 100 of the tape printing apparatus includes the drawing area 101. A graphic 102, for example, a drawing of a coffee set comprising a coffee cup and a saucer, is displayed on the drawing area 101. The input width W1 of the drawing area 101 corresponds to the width of the tape on which the graphics 102 is to be printed.

When the graphic 102 is printed on the narrow tape 103, for example, the input width W1 of the drawing area 101 is modified to correspond to the narrow width W2 of the narrow tape 103. Therefore, the entire drawing area 101 is scaled down to correspond to the narrow width W2 and the reduced graphic 102 is printed on the narrow tape 103. When the graphic 102 is printed on the wide tape 104, the input width W1 of the drawing area 101 is modified to correspond to the wide width W3 of the wide tape 104. Therefore, the entire drawing area 101 is magnified to correspond to the wide tape width W3 and the magnified graphic 102 is printed on the wide tape 104.

As shown in FIG. 15, the drawing area 101 of the graphic input panel 100 is pre-divided into the partial widths W4 and W5, each corresponding to the width of one of the tapes 103 and 104. For example, the partial input width of the drawing area 101 is set to W4 when the narrow tape 103 is used. Thus, the partial width W4 is equal to the narrow width W2 of the narrow tape 103. Furthermore, the partial width W4 extends from an upper edge of the drawing area 101. Likewise, the partial input width of the drawing area 101 is set to W5 when the wide tape 104 is used. Thus, the partial width W5 is equal to the wide width W3 of the wide tape 104. Furthermore, the partial width W5 extends from the upper edge of the drawing area 101.

Thus, when the graphic 102 drawn on the drawing area 101 is printed on the narrow tape 103, the partial input width W4 of the drawing area 101 corresponds to the width W2 of the narrow tape 103. However, the portion of the drawing area 101 corresponding to the partial width W4 contains only part of the graphic 102. Therefore, only an upper end of the coffee cup of the graphic 102 is printed on the narrow tape 103. Similarly, when the graphic 102 is printed on the wide tape 104, the partial input width W5 of the drawing area 101 corresponds to the width W3 of the wide tape 104. However, the portion of the drawing area 101 corresponding to the partial width W5 also contains only part of the graphic 102. Therefore, only a bowl-like portion of the coffee cup of the graphic 102 is printed on the wide tape 104.

As shown in FIG. 14, the entire drawing area 101 is printed on the narrow tape 103 and on the wide tape 104. However, the graphic 102 cannot be printed so that the outer edges of the graphic 102 extend to the edges of each tape. That is, the best possible use of each of the tapes is not obtained, as the graphic 102 is printed smaller than is necessary to completely fit onto the tapes 103 and 104 having the widths W2 and W3, respectively. Thus, the graphic 102 input via the graphics input panel 100 is not printed to the limit of each tape width.

As shown in FIG. 15, the partial input widths W4 and W5 and their positions on the drawing area 101 are determined in advance. The partial width W4 or W5 is selected based on the width of the tape to be used when printing the graphic 102. It is therefore difficult to reliably input the graphic 102 fully within the partial input width W4 or W5. Thus, if the graphic 102 is not properly drawn within the partial input width W4 or W5, then the graphic 102 is not properly printed on the narrow tape 103 or the wide tape 104, respectively.

Figure 1:
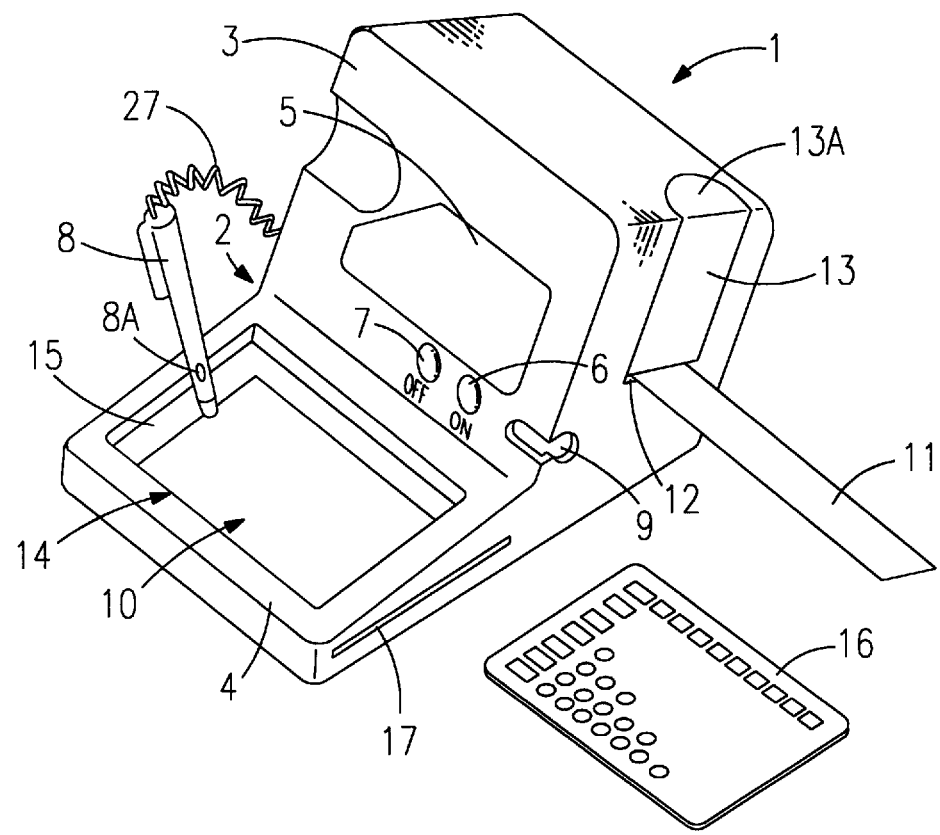
FIG. 1 is a perspective view of a first embodiment of a tape printing apparatus of this invention.

A first embodiment of the tape printing apparatus of this invention is shown in FIGS. 1–5. As shown in FIG. 1, a tape printing apparatus 1 has a printer body 2 which comprises a rising portion 3 and a horizontal portion 4. A liquid crystal display 5 is positioned in the rising portion 3. A power on-switch 6 and a power off-switch 7 are located below the liquid crystal display 5. A pen holding groove 9 for holding an input pen 8 is provided adjacent to the power on-switch 6. The input pen 8 has a pen switch 8A. The input pen 8 is electrically connected to the printer body 2 through a cable 27.

A tape printing unit 25 for printing the graphic on a transparent film tape using an ink ribbon and for applying a pressure sensitive adhesive double coated tape with release pattern paper to a graphics printing surface of the tape to produce a graphic-printed tape 11 is incorporated into the rising portion 3. Because this type of tape printing unit 25 is well known, a detailed description of it is omitted.

The graphic-printed tape 11 is discharged through a tape ejection port 12 formed on one side of the rising portion 3. A tape cutter 13 is provided above the tape ejection port 12.

After the graphic-printed tape 11 has been printed and ejected through the tape ejection port 12, the tape cutter 13 cuts the graphic-printed tape 11 by pressing a pressing portion 13A of the tape cutter 13 downward.

A data input unit 14 for inputting various data, such as graphic data, etc., with the input pen 8 is provided in the horizontal portion 4. The data input unit 14 is operated by placing various data input sheets on a transparent touch panel (not shown) having a transparent spacer positioned between two transparent electrode sheets. A graphics input panel sheet 10 for inputting graphic data is placed on the transparent touch panel, as shown in FIG. 2.

Figure 3:
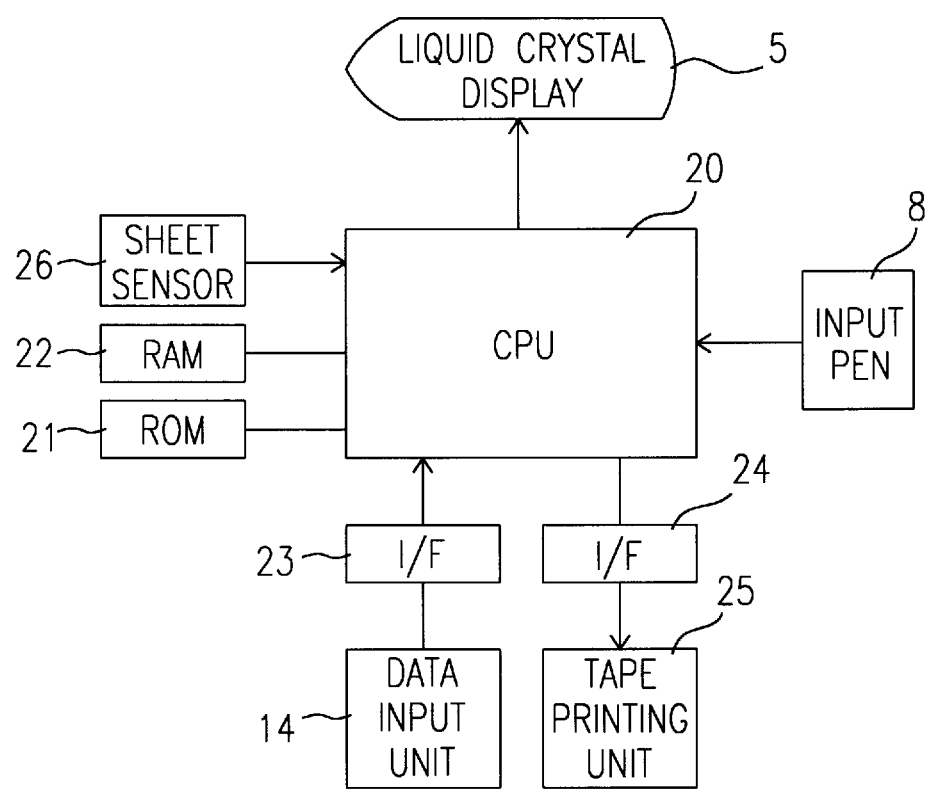
FIG. 3 is a block diagram of the control system for the first preferred embodiment of the tape printing apparatus shown in FIG. 1.
Figure 4:
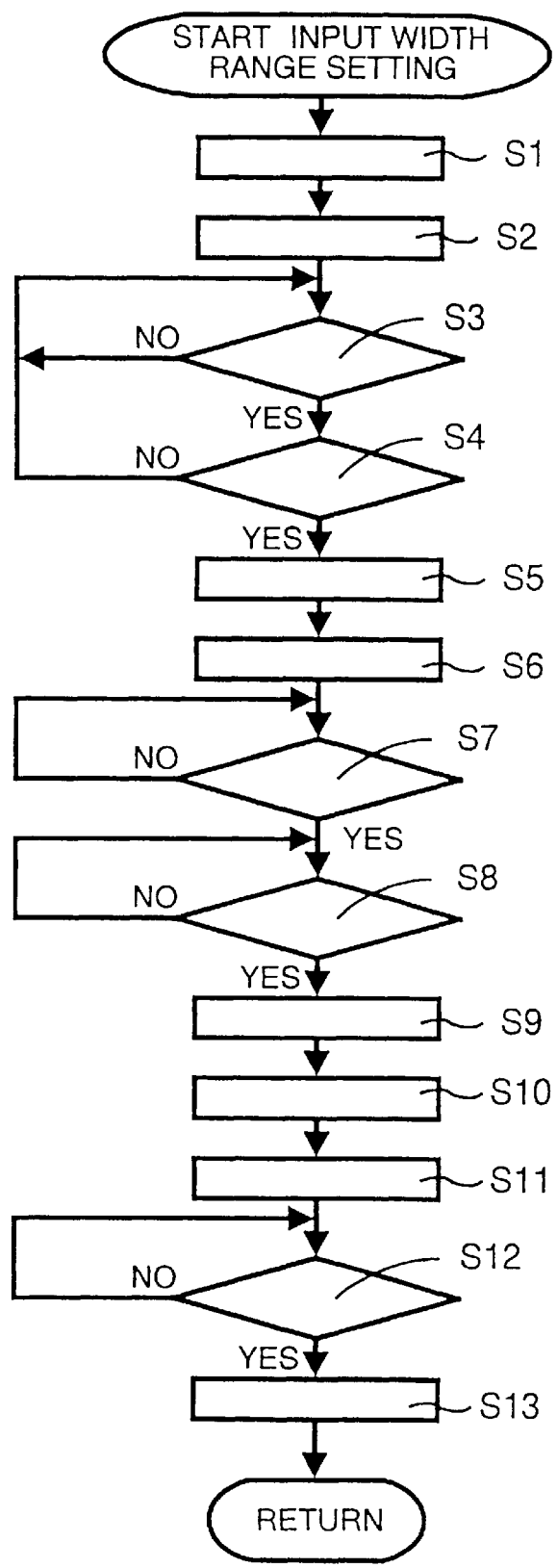
FIGS. 4A and 4B are a flowchart outlining one preferred method for setting the input width.

Various known sheets, such as a keyboard sheet 16 for inputting characters, symbols, etc., and the like can be used as the data input sheets. These data input sheets are exchanged with one another as desired through a sheet insertion/extraction port 17. A sheet sensor 26, as shown in FIG. 3, is provided below the data input unit 14 to detect which data input sheet is placed on the touch panel. When the inserted data input sheet is detected by the sheet sensor 26, a data input mode corresponding to inserted data input sheet is set.

Figure 2:
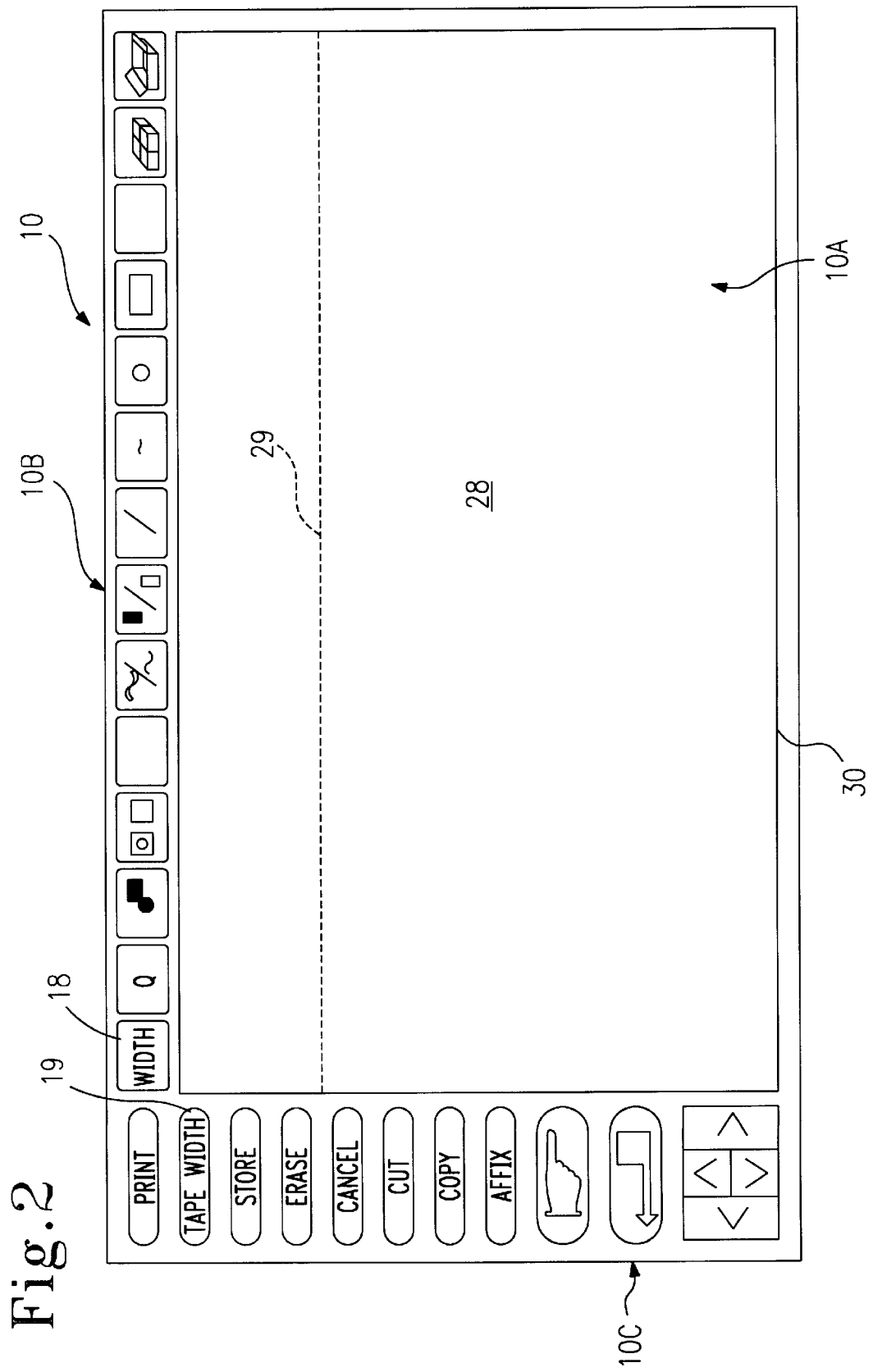
FIG. 2 is a plan view illustrating a graphics input panel sheet placed on a data input unit.

As shown in FIG. 2, a drawing area 10A is provided on the graphics input panel sheet 10. A tool switch unit 10B having a variety of tool switches, including an input width set switch 18 used when graphic data is inputted, is positioned at a top side of the drawing area 10A. A command switch unit 10C having a variety of command switches, including a tape width set switch 19, is positioned at a left side of the drawing area 10A. The input width set switch 18 is pressed by the input pen 8 when an input width of a graphic is to be set within the graphics input panel sheet 10. The tape width set switch 19 is depressed by the input pen 8 when the width of a tape incorporated into the tape printing unit 25 is to be set.

FIG. 3 is a block diagram of the control system of the tape printing apparatus 1. The tape printing apparatus 1 comprises a CPU 20, a ROM 21 and a RAM 22. The CPU 20 is used to control the overall tape printing apparatus 1 based on various control programs stored in the ROM 21. The ROM 21 stores an input range setting processing program and other various programs necessary to control the tape printing apparatus 1. The RAM 22 temporarily stores data and/or results of various calculations performed by the CPU 20, including, for example, graphic data input through the graphics input panel sheet 10 and the input pen 8, upper-end position data and lower-end position data for defining a graphic input width on the graphics input panel sheet 10 set via the input pen 8, tape width data set by the tape width set switch 19, etc. However, the control system for the tape printing apparatus can be implemented on a programmed microprocessor or microcontroller and peripheral integrated circuit elements, an ASIC or other integrated circuit, a hardwired electronic or logic circuit such as a discrete element circuit, a programmable logic device such as a PLD, PLA or PAL, or the like. In general, any device which can implement a finite state machine capable of implementing the flowchart shown in FIGS. 4A–B can be used to implement the control system for the tape printing apparatus.

The sheet sensor 26 is used to detect the type of data input sheet inserted into the data input unit 14. When the graphics input panel sheet 10 is detected by the sheet sensor 26, the CPU 20 enters into the graphics input mode and controls the liquid crystal display 5 to display the drawing cursor. When the input width set switch 18 of the tool switch unit 10B on the graphics input panel sheet 10 is pressed via the input pen 8, a switch signal produced by depressing the input width set switch 18 is output from the data input unit 14 through an interface 23 to the CPU 20, which in response enters into an input width setting mode. In the input width setting mode, an upper-end position and a lower-end position of an input width area 28 are set using the graphics input panel sheet 10 and the pen switch 8A of the input pen 8. Under the control of the CPU 20, data from the data input unit 14 about the upper-end position and data about the lower-end position are stored in the RAM 22.

After the input width area in the drawing area 10A on the graphics input panel sheet 10 has been set as described above, graphic data is inputted within the input width area via the input pen 8. The graphic data is stored in the RAM 22. When a print switch in the command switch unit 10C is pressed, the graphic data stored in the RAM 22 is outputted via an interface 24 to the tape printing unit 25, where the graphic data is printed on a tape while the tape width data set by the tape width set switch 19 and the input width data set by the input width set switch 18 are associated to each other, thereby producing a graphic-printed tape 11.

The operation of the tape printing apparatus 1 of this first preferred embodiment is outlined in FIGS. 4A and 4B. When the sheet sensor 25 detects that the graphics input panel sheet 10 has been inserted into the data input unit 14, the CPU 20 enters the graphics input mode, so that the drawing cursor for inputting a graphic is displayed on the liquid crystal display 5. Next, when the input width set switch 18 of the tool switch unit 10B on the graphics input panel sheet 10 is pressed via the input pen 8, the input width setting mode is entered.

When the input width setting mode is entered in step S1, the drawing cursor displayed on the liquid crystal display 5 is turned off. In step S2, a message for facilitating the input of an upper-end position of the input width area 28 of the drawing area 10A is displayed on the liquid crystal display 5. At this time, for example, a facilitation message such as "INPUT UPPER-END POSITION OF INPUT WIDTH" is displayed on the liquid crystal display 5.

In step S3, based on whether one of points within the drawing area 10A on the graphics input panel sheet 10 has been pressed by the input pen 8, the CPU 20 determines whether the input pen 8 is positioned within the drawing area 10A. If, in step S3, the CPU determines that the input pen 8 is not positioned within the drawing area 10A, then control loops back to step S3, thus entering a standby state, which is maintained until a point within the drawing area 10A is pressed by the input pen 8. Once the CPU 20 determines that the input pen 8 is positioned within the drawing area 10A, control continues to step S4. In step S4, the CPU 20 determines whether the pen switch 8A is pressed, i.e. is in an "ON" state. If, in step S4, the CPU 20 determines that the pen switch 8A is in an "OFF" state, control again returns to step S3. If, in step S4, the CPU 20 determines that the pen switch 8A is in the "ON" state, control continues to step S5.

In step S5, the upper-end position 29 of the input width area 28 is input and the upper-end position data of the input width area 28 is determined. The determined upper-end position data is stored in the RAM 22.

Then, in step S6, once the upper-end position 29 of the input width area 28 of the drawing area 10A has been determined and stored, a message for facilitating the setting of a lower-end position of the input width is displayed on the liquid crystal display 5. At this time, the facilitation message is, for example, "INPUT LOWER-END POSITION OF INPUT WIDTH" and is displayed on the liquid crystal display 5 as described above.

Then, in step S7, the CPU 20 determines whether the pen switch 8A has been turned off (i.e. released). If, in step S7, the pen switch 8A has not yet been turned off control loops back to step S7, thus entering another standby state, which is maintained until the pen switch 8A is turned off. Once the CPU 20 determines that the pen switch 8A has been turned off, control continues to step S8. In step S8, the CPU 20 determines whether the pen switch 8A has been turned on again. If, in step S8, the CPU 20 determines that the pen switch 8A has not yet been turned on, control loops back to step S8, thus entering another standby state, which is maintained until the pen switch 8A is turned on. Once the CPU 20 determines that the pen switch 8A has been turned on, control continues to step S9. In step S9, a point in the drawing area 10A which has been pressed by the input pen 8 is detected. The detected point is used to determine a lower-end position 30 of the input width area 28, which is stored in the RAM 22. Thus, the input width area 28 within the drawing area 10A is set. When the upper-end position 29 is set to a position indicated by the dotted line and the lower-end position 30 is set to the bottom of the drawing area 10A, as shown in FIG. 2, for example, the input width area 28 defined by the upper end position 29 and the lower-end position 30 is set.

Then, in step S10, the input facilitation message displayed on the liquid crystal display 5 is turned off. Subsequently, in step S11, a first drawing area coefficient $DAC_y$ is determined and stored in the RAM 22 based on upper-end position 29, the lower-end position 30, and tape width data input by using the tape width set switch 19, all of which are stored in the RAM 22.

The first drawing area coefficient $DAC_y$ defines the relationship between the width of the tape, as set using the tape width set switch 19, and the width of the input width area 28 of the drawing area 10A, as defined by the set upper-end and lower-end positions 29 and 30. The first drawing area coefficient $DAC_y$ corresponds to a conversion coefficient for converting the width of the input width area 28 to the tape width, and is defined as:

$$DAC_y = \text{tape width/input width.}$$

In order to transform the drawing area coordinate data for the graphic within the input width area 28 into tape coordinate data within the tape width of the tape, the input drawing coordinate data is multiplied by the drawing area coefficient $DAC_y$:

$$\text{tape coordinate data} = DAC_y * \text{drawing area coordinates.}$$

A second drawing area coefficient $DAC_x$, corresponding to the lengthwise direction of the tape orthogonal to the tape transverse direction, can be determined by multiplying the first drawing area coefficient $DAC_y$ by the ratio of the input width, as defined by the upper end and lower end positions 29 and 30, to the length of the drawing area 10A:

$$DAC_x = \text{drawing area length/input width.}$$

Thus, the graphic can be printed while the input width and tape width set as described above are associated with each other by converting the coordinate data actually inputted within the input width area 28 into the tape coordinates based on the first and second drawing area coefficients $DAC_y$ and $DAC_x$.

After both of the first and second drawing area coefficients $DAC_y$ and $DAC_x$ are determined in step S11, in step S12, the CPU 20 determines whether the pen switch 8A has again been turned off. If the pen switch 8A is not turned off, control loops back to step S12, thus entering another standby state, which is maintained until the pen switch 8A is not turned off. Once the CPU 20 determines that the pen switch 8A has been turned off, control continues to step S13. In step S13, the drawing cursor is again displayed on the liquid crystal display 5. Control then continues to step S14, where the input width setting processing program ends.

The desired graphic data is then created by moving the input pen 8 within the input width area 28 of the graphics input panel sheet 10 after the input width for the graphic has been set. The graphic data is stored in the RAM 22. When the print switch of the command switch unit 10C on the graphics input panel sheet 10 is pressed by the input pen 8, the graphic data read from the RAM 22 is coordinate-transformed to correspond to the tape width, based on the first drawing area coefficient $DAC_y$ for the tape width (Y-axis direction) and the drawing area coefficient $DAC_x$ for the tape length (X-axis direction). The coordinate-transformed graphic data is output through the interface 24 to the tape printing unit 25, which prints the graphic data on the corresponding tape to produce the graphic-printed tape 11.

Figure 5:
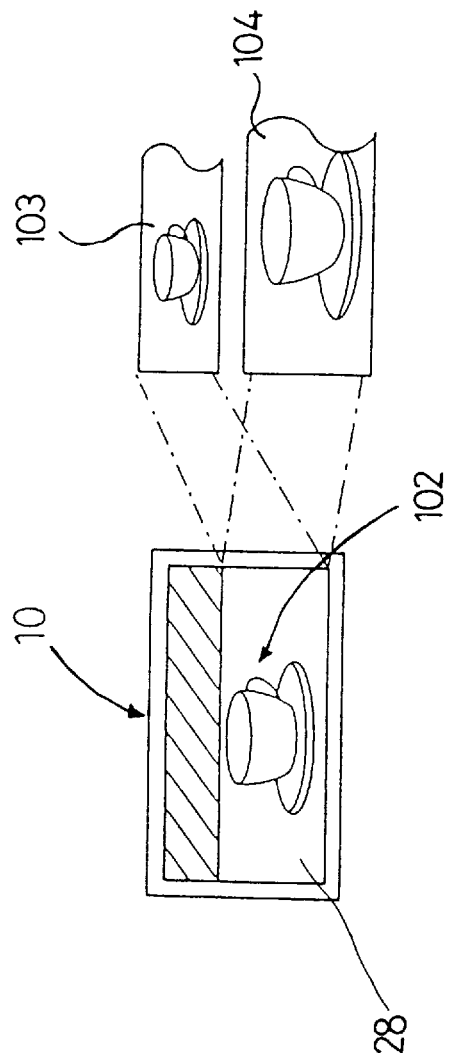
FIG. 5 shows the result when printing a graphic input based on a set input width onto two tapes of different width.

In the graphics input panel sheet 10, as shown in FIG. 5, the graphic input width area 28 has been set as described above. The graphic 102 of the coffee set has been drawn and input within the input width area 28. To print the graphic 102 on the narrow tape 103, the graphic data for the graphic 102 is transformed into tape coordinates based on the respective first and second drawing area coefficients $DAC_y$ and $DAC_x$ for the narrow width W2 of the tape 103. Thus, the graphic 102 input within the input width area 28 can be printed on narrow tape 103 to the limit of its width.

The graphic data for the graphic 103 can also be transformed into tape coordinates based on the respective first and second drawing area coefficients $DAC_y$ and $DAC_x$ for the wide tape 104 when the graphic 102 is printed on the wide tape 104 in the same manner as described above. Therefore, the graphic 102 input within the input width area 28 is printed on the wide tape 104 to the limit of its width.

Figure 6:
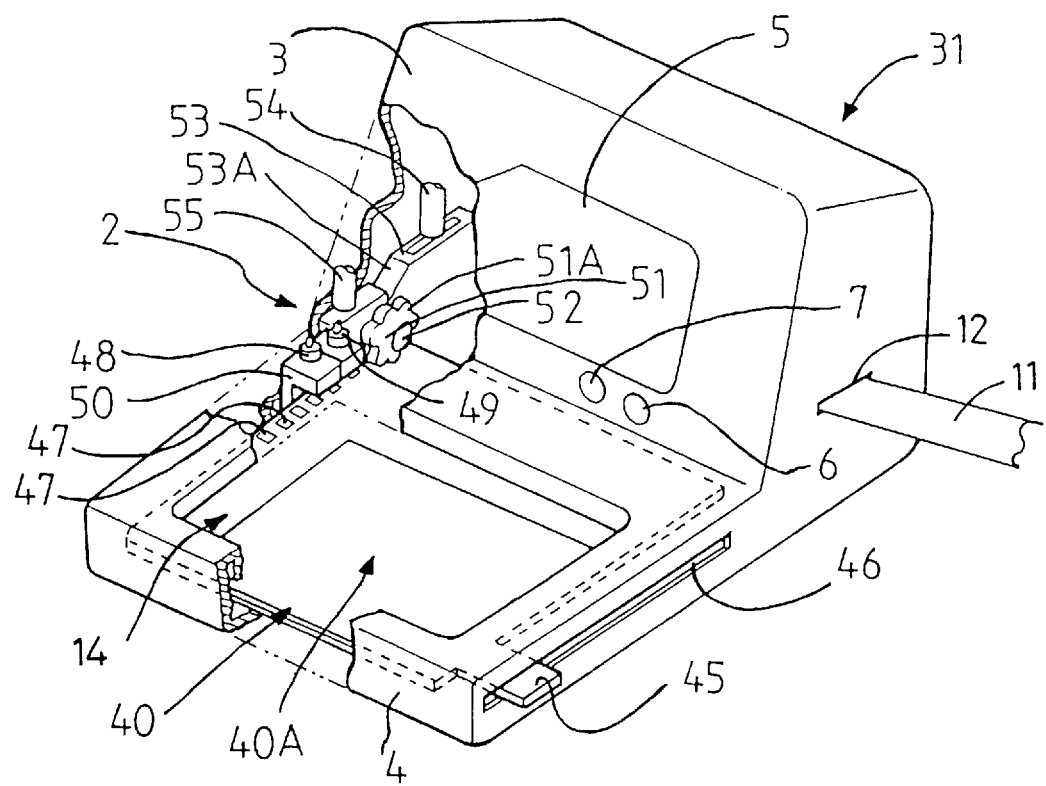
FIG. 6 is a partial cutaway perspective view of a second preferred embodiment of the tape printing apparatus of this invention.

A second preferred embodiment of the tape printing apparatus 1 of this invention is shown in FIGS. 6–13. FIG. 6 shows a partly cut-away perspective view of the second preferred embodiment of the tape printing apparatus 31. The tape printing apparatus 31 is basically identical in structure to the tape printing apparatus 1 of the first preferred embodiment. The tape printing apparatus 31 has a printer body 2 comprising a rising portion 3 and a horizontal portion 4. A liquid crystal display 5 is positioned in the rising portion 3. A drawing cursor is displayed on the liquid crystal display 5 in a graphics input mode and each graphic input from a graphics input panel sheet 10 is displayed on the liquid crystal display 5. A power on-switch 6 and a power off-switch 7 are located below the liquid crystal display 5.

A tape printing unit 25 for printing the graphics on the transparent film tape using an ink ribbon and based on the graphic data, and for applying a pressure sensitive adhesive double coated tape with release pattern paper to a graphics printing surface of the tape to produce a graphic-printed tape 11 is incorporated into the rising portion 3.

A tape ejection port 12 for discharging the graphic-printed tape 11 produced by the tape printing unit 25 is defined in one side face of the rising portion 3. The graphic-printed tape 11 is discharged from the printer body 2 through the tape ejection port 12.

A data input unit 14 for inputting various data, such as graphic data, etc. with an input pen or the like, is provided within the horizontal portion 4. The data input unit 14 is operated by placing various data input sheets on a transparent touch panel (not shown) having a transparent spacer positioned between two transparent electrode sheets. The graphics input panel sheet 40 of the second preferred embodiment for inputting graphic data is placed on the transparent touch panel, as shown in FIG. 6. The graphics input panel sheet 40 has a drawing area 40A and generally is configured like the graphics input panel sheet 10 of the first preferred embodiment.

A knob 45 is formed on one side of the graphics input panel sheet 40 and extends to the outside of the printer body 2 through a sliding groove 46. The graphics input panel sheet 40 is movable in forward and backward directions within the horizontal portion 4. Thus, the graphics input panel sheet 40 can be displaced by moving the knob 45 in the forward and backward directions along the sliding groove 46. A plurality of detection holes 47 are provided on the other side of the graphics input panel sheet 10 in a linear array or a row.

A pair of first and second photocouplers 48 and 49 are provided on a support base 50 on the same side of the horizontal portion 4 as the detection holes 47 defined in the graphics input panel sheet 40. The first and second photocouplers 48 and 49 detect the respective detection holes 47 in accordance with predetermined detection patterns while the graphics input panel sheet 40 is moved. A toothed positioning wheel 51 is rotatably supported by the horizontal portion 4 through a hinge pin 52 on the rear side of a support base 50. The teeth 51A of the toothed positioning wheel 51 meshingly engage the corresponding detection holes 47 as the toothed positioning wheel 51 rotates to position the graphic input panel sheet 40. A leaf spring 53, which is attached to two bosses 54 and 55 provided within the printer body 2, is provided above the toothed positioning wheel 51. The leaf spring 53 has an engagement portion 53A which elastically engages the teeth 51A of the toothed positioning wheel 51. The engagement portion 53A controls the rotation of the positioning toothed wheel 51 to securely position the graphics input panel sheet 40.

Figure 7:
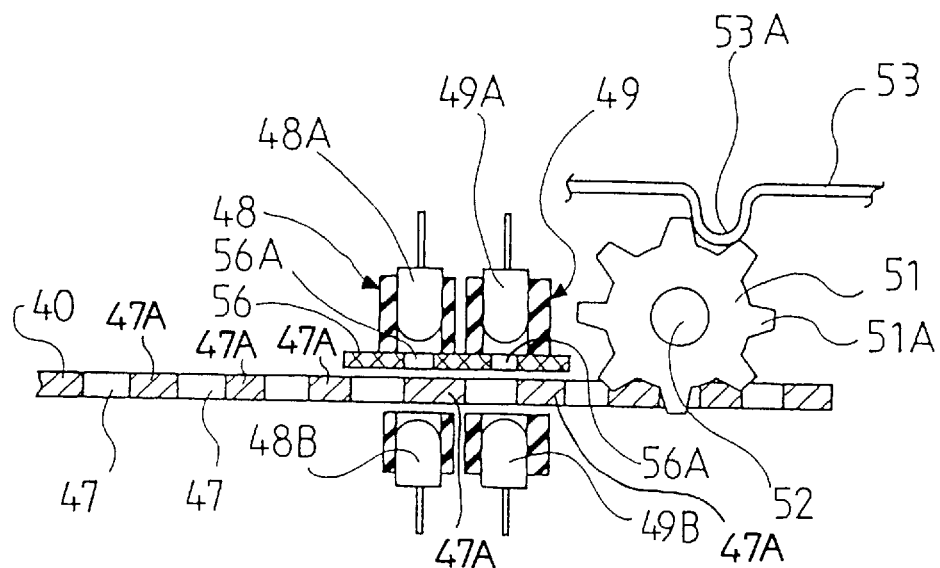
FIG. 7 is a cross-sectional view showing the first and second photocouplers.
Figure 8:
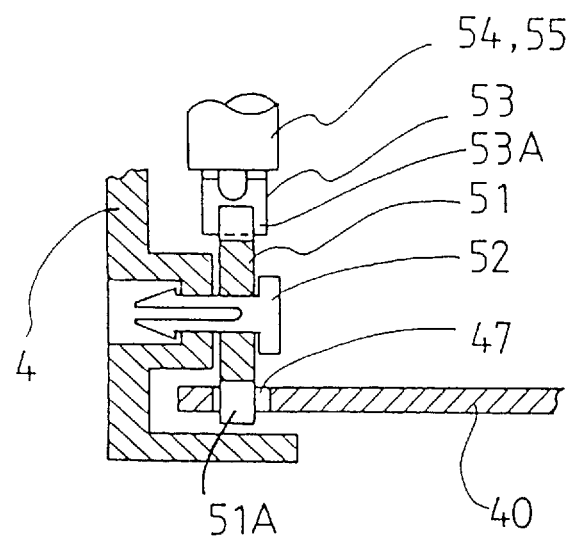
FIG. 8 is a cross-sectional view showing a toothed positioning wheel.

As shown in FIGS. 7 and 8, the first and second photocouplers 48 and 49 respectively comprise light-emitting devices 48A and 49A and light-receiving devices 48B and 49B. A mask 56 is provided between the light-emitting devices 48A and 49A and the light-receiving devices 48B and 49B. Two transmissive holes 56A are defined in the mask 56 corresponding to the light-emitting devices 48A and 49A.

The transmissive holes 56A restrict the flux widths of the light emitted from the light-emitting devices 48A and 49A to a predetermined width. Preferably, the size of each transmissive hole 56A is set to one-half the size of each detection hole 47 defined in the graphics input panel sheet 40. The size of the portions 47A of the graphics input panel sheet 40 extending between the detection holes 47 defined in the graphics input panel sheet 40 is set to the same length or size as that of the detection holes 47. Accordingly, the size of the portion extending between portions 47A of the detection holes 47 is also twice that of each transmissive hole 56A.

Thus, when the graphics input panel sheet 40 is displaced in the forward and backward directions within the horizontal portion 4 by the knob 45, as described above, the following four types of phase patterns, comprising combinations of ON and OFF signals from the respective photocouplers 48 and 49, are obtained. That is, the first photocoupler 48 and the second photocoupler 49 are both turned off (phase pattern 0), the first photocoupler 48 is turned on and the second photocoupler 49 is turned off (phase pattern 1), the first photocoupler 48 and the second photocoupler 49 are both turned on (phase pattern 3) and the first photocoupler 48 is turned off and the second photocoupler 49 is turned on (phase pattern 2). These phase patterns are changed each time the graphics input panel sheet 40 is displaced a distance equal to the size of the transmissive hole 56A of the mask 56.

As shown in FIG. 7, for example, light emitted from the light-emitting device 48A of the first photocoupler 48 is shielded by its one of the portions 47A extending between the detection holes 47, so that the light-receiving device 48B is turned off. Further, light emitted from the light-emitting device 49A of the second photocoupler 49 is received by the light-receiving device 49B by passing through the corresponding transmissive hole 56A and one of the detection holes 47, so that the light-receiving device 49B is turned on. Therefore, this case corresponds to the phase pattern 2.

The graphics input panel sheet 40 can be stably positioned, since, as shown in FIGS. 7 and 8, at all times at least one of the teeth 51A of the toothed positioning wheel 51 meshingly engages one of the detection holes 47, and, at the same time, the toothed positioning wheel 51 is positioned and interlocked by the engagement portion 53A.

Figure 9:
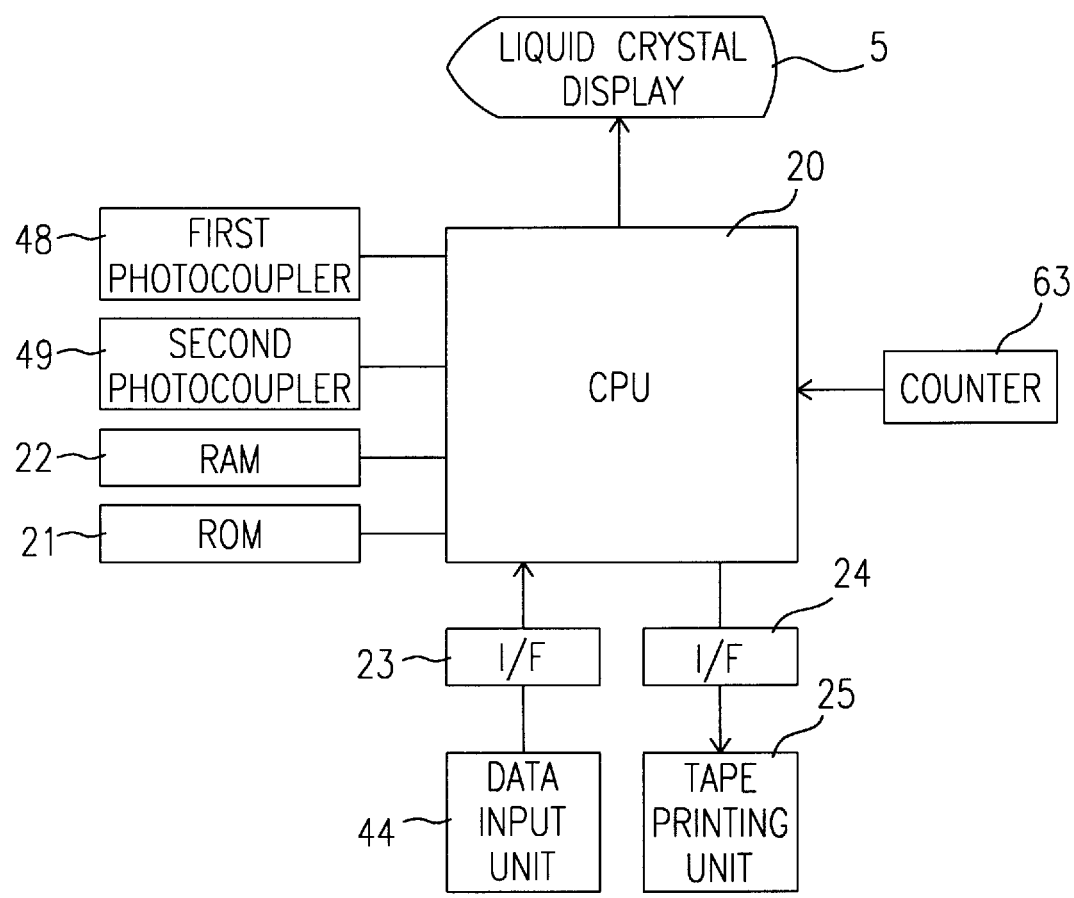
FIG. 9 is a block diagram of the control system for the second preferred embodiment of the tape printing apparatus shown in FIG. 6.

FIG. 9 is a block diagram of the control system of the tape printing apparatus 31. The control system of the tape printing apparatus 31 comprises a CPU 20, a ROM 21 and a RAM 22. The CPU 20 is used to control the overall tape printing apparatus 31 based on various control programs stored in the ROM 21. The ROM 21 stores a panel sheet position detecting program for detecting the position of the graphics input panel sheet 40 and other various programs necessary to control the tape printing apparatus 31. The ROM 21 stores a phase pattern table including the above-described phase patterns 0, 1, 3 and 2, as shown in FIG. 10, based on the combinations of the ON and OFF signals from the first and second photocouplers 48 and 49. The ROM 21 also stores an added-value table, as shown in FIG. 11, which is used to add and/or subtract the values counted by a counter 63 based on a previously-detected phase pattern and a newly-detected phase pattern each time the graphics input panel sheet 40 is moved past the transmissive holes 56A of the mask 56.

It should be appreciated that the tables shown in FIGS. 10 and 11 can also be implemented using discrete combinatorial logic elements, an ASIC or other integrated circuit, or a programmable logic circuit such as a PLD, a PLA, or a PAL, in place of the ROM 21. These systems, including the ROM 21, are generally referred to as a converter, or conversion means, for converting the patterns of said detection holes detected by said pair of detectors into movement values.

The control system for the tape printing apparatus of this second preferred embodiment also includes a second converter, or second conversion means, for converting the total movement value into a travel distance of the graphics input panel. Preferably, this is a value stored in the ROM 21 or the like which is multiplied, by the control system, by the total movement value to obtain the distance traveled by the graphics input panel.

However, the control system for the tape printing apparatus of this second preferred embodiment can also be implemented on a programmed microprocessor or microcontroller and peripheral integrated circuit elements, an ASIC or other integrated circuit, a hardwired electronic or logic circuit such as a discrete element circuit, a programmable logic device such as a PLD, PLA or PAL, or the like. In general, any device which can implement a finite state machine capable of implementing the flowcharts shown in FIGS. 12A–B or 16A–16B can be used to implement the control system for the tape printing apparatus.

The RAM 22 temporarily stores: 1) the graphic data input using the graphics input panel sheet 40 and the input pen 8 or the like, 2) the phase pattern data obtained from the phase pattern table based on the combinations of the ON and OFF signals from the first and second photocouplers 48 and 49, and 3) the positional counted values obtained by adding and subtracting the values counted by the counter 63 from the added-value table.

After an input width area 28 in the drawing area 40A of the graphics input panel sheet 40 has been set based on the counted values of positions stored in the RAM 22, the graphic data is input within the input width area 28 via the input pen 8 or the like and is stored in the RAM 22 through the interface 23. When the print switch of the command switch unit on the graphic input panel sheet 40 is pressed, the graphic data stored in the RAM 22 is outputted through the interface 24 to the tape printing unit 25, where the graphic data is printed on the tape based on the tape width and the input width to create the graphic-printed tape 11.

FIGS. 12A and 12B are a flowchart outlining one preferred method for detecting the position of the graphics input panel sheet 40. When an input width set switch 18 on the graphic input panel sheet 40 is first pressed in FIG. 12, the CPU 20 enters a detection mode for sensing the position of the graphics input panel sheet 40. Then, in step S21, the initial ON and/or OFF states of the first and second photocouplers 48 and 49 are input. At this time, the corresponding phase pattern is determined based on the phase pattern table, as shown in FIG. 10, from the combination of the ON and OFF signals from the first and second photocouplers 48 and 49. For example, when the first and second photocouplers 48 and 49 are both turned off, for example, the phase pattern is 0. At the same time, the counter 63 is cleared to set its value to zero.

In step S22, data about the detected phase pattern for the initial states of the photocouplers 48 and 49 is stored in the RAM 22. Then, each newly detected phase pattern and the previously detected phase pattern are stored in the RAM 22. Next, in step S23, the newly detected phase pattern and the previously detected phase pattern are used to reference the added value table. Based on the entry indicated by the new and previous phase patterns, an added value is read from the added value table. The read added value is then added to the value stored in the counter 63.

Since the graphics input panel sheet 40 is manually shifted by the knob 45, the graphics input panel sheet 40 is not necessarily moved smoothly in a single direction. Chattering may occur due to slight displacements of the graphics input panel sheet 40 in the forward and backward directions. In addition, the graphics input panel sheet 40 may be intentionally moved back in the opposite direction after it has been shifted excessively from a previous position. Therefore, each read added value is added to or subtracted from the position value counted by the counter 63 to accurately detect the current relative position of the graphics input panel sheet 40 relative to the initial position of the graphics input panel sheet 40.

Then, in step S24, the position value counted by the counter 63 is read and the read counted position value is stored in the RAM 22. The obtained counted position value corresponds to a travel distance of the graphics input panel sheet 40 from the initial position of the graphics input panel sheet 40. The travel distance of the graphics input panel sheet 40 is calculated based on the counted position value to determine a graphic input width of the graphic input width area 28 of the drawing area 40A of the graphics input panel sheet 40.

Figure 16A:
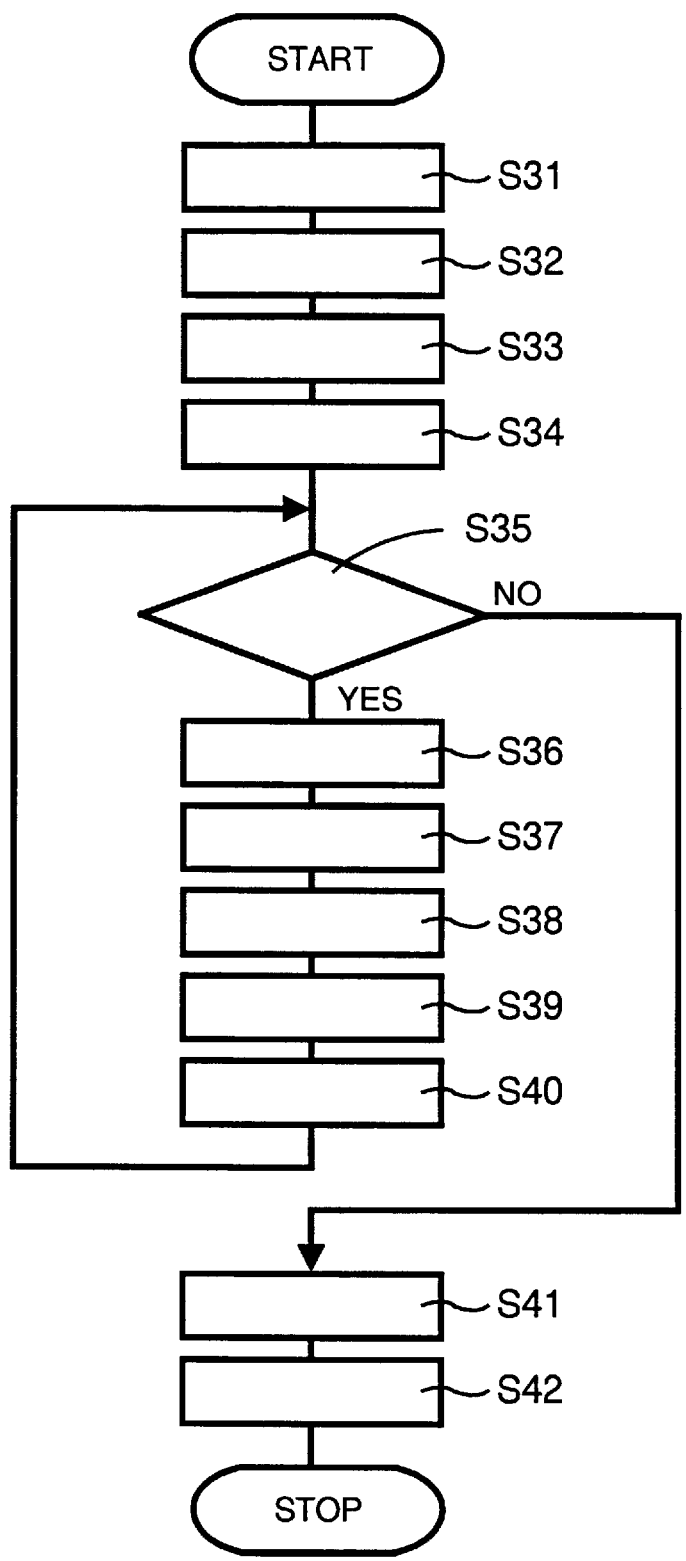

FIGS. 16A and 16B show in greater detail the method for detecting the graphics input panel sheet position of FIGS. 12A and 12B. First, after the input width set switch 18 is pressed to enter the input width setting mode, in step S31, the counter is cleared to set its value to 0, and the current and previous phase pattern storage locations in the RAM 22 are cleared. Then, in step S32, the initial states of the photocouplers 48 and 49 when the input width setting switch is pressed are input. Based on the initial states of the photocouplers 48 and 49 input in step S32, in step S33, the initial phase pattern is determined from the phase pattern table stored in the ROM 21. Then, in step S34, the initial phase pattern is stored as the current phase pattern.

Next, in step S35, the controller determines if the input width set switch 18 has been pressed again to exit the input width setting mode. If the input width set 18 switch has been pressed again, control jumps to step S41. Otherwise, control continues to step S36.

In step S36, the current states of the photocouplers 48 and 49 are again input. Then, in step S37, a new phase pattern is determined from the phase pattern table stored in the ROM 21 and the current states of the photocouplers 48 and 49. Then, in step S38, the current phase pattern is restored as the previous phase pattern, and the new phase pattern is stored as the current phase pattern in the RAM 22. Then, in step S39, the current and previous phase patterns stored in the RAM 22 are used to determine the added value from the added-value table stored in the ROM 21. Next, in step S40, the added value determined from the added-value table is added to the counter. Of course, if the added value is negative, adding it to the counter reduces the value counted by the counter.

Once the input width set switch 18 is pressed again to exit the input width setting mode, control jumps from step S35 to step S41. In step S41, the controller converts the total added value counted by the counter into a displacement value indicating the amount the graphics input panel sheet was moved. Then, in step S42, the input width of the input width area is set to the determined displacement value. The process then stops.

FIG. 13 shows the relationships between the ON and OF states of the first and second photocouplers 48 and 49, the respective phase patterns, the added values and the counted position values as the changing position of the graphic input panel sheet 40 is detected. As shown in FIG. 13, the graphics input panel sheet 40 is moves over the range from step A to step K. Furthermore, chattering occurs at steps G and H and the direction of movement of the graphics input panel sheet 40 changes at step J.

At step A, the graphics input panel sheet 40 is not moving and the first and second photocouplers 48 and 49 are both in an off state. Accordingly, the phase pattern is 0, as shown in phase pattern table shown in FIG. 10. The previous phase pattern is 0 because the graphics input panel sheet 40 is not moving. Thus, the added value is 0, as shown in the added-value table shown in FIG. 11. Thus, the counted value of the position remains at 0.

Next, when the graphics input panel sheet 40 is moved from step A to step B, the first photocoupler 48 is turned on. While the second photocoupler 49 remains off. Accordingly, the new phase pattern is 1. Since the previous phase pattern is 0, the added value becomes +1. Thus, the counted position value counted by the counter 63 is now 1.

When the graphics input panel sheet 40 is moved from step B to step F through steps C, D and E, the ON and OFF states of the first and second photocouplers 48 and 49, the phase pattern, the added value, and the counted position value are shown in FIG. 13. Thus, when the graphics input panel sheet 40 is displaced to step F, the counted position value is increased to 5.

When chattering takes place at steps G and H due to the slight movement of the graphics input panel sheet 40 in the forward and backward directions, the first photocoupler 48 and the second photocoupler 49 are both turned on at step G and the new phase pattern becomes 3. Since the previous phase pattern is 1, the added value is +1. Accordingly, the counted position value is 6. However, since the first photocoupler 48 is turned on and the second photocoupler 49 is turned off at step H, the new phase pattern is 1 and the added value is −1. As a result, the counted position value returns to 5. Similarly, the phase pattern, the added value, and the counted position value are respectively 3, +1, and 6 at step I. Further, the phase pattern, the added value, and the counted position value are respectively 2, +1, and 7 at step J before the direction of movement the graphics input panel sheet 40 has changed. At step K, where the graphics input panel is now moving on the other direction, the phase pattern, the added value, and the counted position value are 3, −1, and 6, respectively.

Thus, the travel distance of the graphics input panel sheet 40 is determined based on the counted position value 6 when the graphics input panel sheet 40 has been moved to step K, so that a graphic input width of the graphic input width area 28 of the drawing area 40A of the graphics input panel sheet 40 is determined.

After the graphic input width has been determined, the desired graphic data is inputted within the graphic input width area 28 via the input pen or the like. The graphic is then printed on the tape by the tape printing unit 25 so that a graphic-printed tape 11 is produced. The first drawing area coefficient $DAC_y$ for the width of the tape and the second drawing area coefficient $DAC_x$ for the length of the tape are determined as outlined above in the first preferred embodiment. The graphic is printed on the tape based on the determined first and second drawing area coefficients $DAC_y$ and $DAC_x$. The best possible use of the width of the tape is obtained so that the input graphic is printed on the produced graphic-printed taped 11 to the limit of the width of the tape.

In the tape printing apparatus 31 of the second preferred embodiment, when the graphics input panel sheet 40 placed on the data input unit 44 is moved along the sliding groove 46 by the knob 45, the phase patterns indicative of the detected states of the detection holes 47 are detected based on the combinations of the ON and OFF signals from the first and second photocouplers 48 and 49. The added values are determined based on the variations in the phase patterns. Further, each added value is added to the value counted by the counter 63 to calculate the counted position value. The travel distance of the graphics input panel sheet 40 is determined from the counted position value. Therefore, the graphic-printed tape 11 on which the graphic is printed under the best possible use of the tape width.

This invention is not necessarily limited to the above-outlined first and second preferred embodiments. It will be apparent to those skilled in the art that many changes and modifications can be made without departing from the spirit or scope of the invention as set forth above and in the appended claims.

For example, the first preferred embodiment describes the case where the upper-limit position and the lower-limit position are specified by the pen. However, if the lower-limit position is set as a fixed position, for example, then only the upper-limit position need be set. Although the graphics input panel sheet is provided on the transparent touch panel, the graphics input panel sheet may be loadably and unloadably inserted into a position below the touch panel.

Additionally, the graphic input function and the printing function of the graphics-inputtable tape printing apparatus can be divided into two independent apparatus, a graphics inputting apparatus for inputting the graphic to be printed on the elongated tape, and a tape printing apparatus for actually printing the inputted graphic onto the elongated tape. The graphics inputting apparatus will thus include the display, the graphics input panel and the input width setting system, but not the printing device, while the tape printing apparatus will include the printing device, but none of the graphics input elements. In this case, the graphic can be stored to a cartridge or the like for transferring the graphic between the graphics inputting apparatus and the tape printing apparatus.

What is claimed is:

1. A graphics-inputting apparatus for inputting a graphic to be printed on an elongated tape, comprising:

a graphics input panel having a drawing area having a first width;

a display, the display displaying a graphic input on the graphics input panel; and an input width setting system, the input width setting system setting an input area of the drawing area, the input area having a second width that is less than the first width, wherein a graphic is input into the drawing area of said graphics input panel within the input area.

2. The graphics-inputting apparatus of claim 1, wherein said input width setting system comprises a tape width setting system through which a tape width of the elongated tape is set, said input width setting system determining a drawing area coefficient based on the set input width and the set tape width.

3. The graphics-inputting apparatus of claim 1, wherein the input width set by said input width setting system is associated with a tape width of the elongated tape by a drawing area coefficient.

4. The graphics-inputting apparatus of claim 1, wherein said input width setting system determines an input upper-limit position and an input lower-limit position within the drawing area, the input upper-limit and input lower-limit positions defining the input area of the drawing area of said graphics input panel.

5. The graphics-inputting apparatus of claim 1, further comprising a printer for printing on an elongated tape the graphic displayed on said display.

6. A graphics-inputting apparatus for inputting a graphic to be printed on an elongated tape, comprising:

a graphics input panel having a drawing area;

a display for displaying a graphic input on the drawing area of the graphics input panel; and an input width setting system through which an input width of an input area is set, the graphic input into the drawing area of said graphics input panel within the input area;

wherein said input width setting system determines an input upper-limit position and an input lower-limit position within the drawing area, the input upper-limit and input lower-limit positions defining the input area of the drawing area of said graphics input panel, and said input width setting system comprises:

a pointing mechanism for indicating the upper-limit and lower-limit positions on the drawing area of the graphics input panel, a memory for storing the upper-limit position and the lower-limit position of the drawing area indicated by the pointing mechanism, and a controller for selecting a position input mode for inputting and storing the upper-limit and lower-limit positions.

7. The graphics-inputting apparatus of claim 6, wherein said input width setting system further comprises a tape width setting device, wherein the controller determines at least one drawing area coefficient based on the set input width and at least one of the set tape width and an input length of the drawing area.

8. A graphics-inputting apparatus for inputting a graphic to be printed on an elongated tape, comprising:

a graphics input panel having a drawing area;

a display for displaying a graphic input on the drawing area of the graphics input panel; and an input width setting system through which an input width of an input area is set, the graphic input into the drawing area of said graphics input panel within the input area, wherein said input width setting system comprises:

a plurality of detection holes linearly arranged on one side of said graphics input panel, a moving mechanism for displacing the graphics input panel in a first direction, a pair of detectors for successively detecting patterns of said detection holes when said graphics input panel is displaced by said moving mechanism in the first direction, a first converter for converting the patterns of said detection holes detected by said pair of detectors into movement values, a counter for counting a total movement value as said graphics input panel is displaced, and a second converter for converting the total movement value into a travel distance of said graphics input panel.

9. A graphics-inputting apparatus, comprising:

graphics input means for inputting a graphic to be printed on an elongated tape, and comprising a drawing area;

display means for displaying the graphic input on the drawing area of the graphics input means; and input width setting means for setting an input width of an input area within which the graphic is input into the drawing area of said graphics input means.

10. The graphics-inputting apparatus of claim 9, wherein said input width setting means comprises a tape width setting means for setting a tape width of the elongated tape, said input width setting means determining a drawing area coefficient based on the set input width and the set tape width.

11. The graphics-inputting apparatus of claim 9, wherein the input width set by said input width setting means is associated with a width of the elongated tape by a drawing area coefficient.

12. The graphics-inputting apparatus of claim 9, wherein said input width setting means determines an input upper-limit position and an input lower-limit position within the drawing area, the input upper-limit and input lower-limit positions defining the input area of the drawing area of said graphics input means.

13. The graphics-inputting apparatus of claim 12, wherein said input width setting means comprises:

pointing means for indicating the upper-limit and lower-limit positions on the drawing area of the graphics input means;

memory means for storing the upper-limit position and the lower-limit position of the drawing area indicated by the pointing means; and control means for selecting a position input mode for inputting and storing the upper-limit and lower-limit positions.

14. The graphics-inputting apparatus of claim 13, wherein said input width setting means further comprises tape width setting means, wherein the control means determines at least one drawing area coefficient based on the set input width and at least one of the set tape width and an input length of the drawing area.

15. The graphics-inputting apparatus of claim 9, wherein said input width setting means comprises:

a plurality of detection holes linearly arranged on one side of said graphics input means;

moving means for displacing the graphics input means in a first direction;

detecting means for successively detecting patterns of said detection holes when said graphics input means is displaced by said moving means in the first direction;

first conversion means for converting the patterns of said detection holes detected by said detecting means into movement values;

counting means for counting a total movement value as said graphics input means is displaced; and second conversion means for converting the total movement value into a travel distance of said 8graphics input means.

16. A method for maximizing a size of a graphic to be completely printed on an elongated tape having a tape width, the method comprising the steps of:

setting an input width for an input area, within which the graphic is input, of a drawing area of a graphics-inputting apparatus;

setting the tape width of the elongated tape on which the input graphic is to be printed; and modifying drawing coordinates of the graphic input within said input area to generate tape coordinates for completely printing the graphic on the elongated tape at the maximum size.

17. The method for maximizing a size of a graphic of claim 16, wherein the input width setting step comprises the steps of:

determining if a pointing device is pointing to a first position within said drawing area;

determining one of an upper-end position and a lower-end position of said input area corresponding to said first position pointed to by said pointing device;

storing the one of the upper-end position and the lower-end position pointed to by said pointing device;

determining if a pointing device is pointing to a second position within said drawing area;

determining the other of the upper-end position and the lower-end position of said input area corresponding to said second position pointed to by said pointing device;

storing the other of the upper-end position and the lower-end position pointed to by said pointing device; and converting a distance between the upper-end position and the lower-end position into the input width of said input area.

18. The method for maximizing a size of a graphic of claim 16, wherein the drawing area of the graphics-inputting apparatus is a portion of a graphics input panel, the input width setting step comprising the steps of:

displacing said graphics input panel in a first direction, said graphics panel having a plurality of detection holes arranged along one edge;

detecting patterns of said detection holes when said graphics input panel is displaced in the first direction;

converting the detected patterns of said detection holes into movement values;

determining a total movement value from said movement values as said graphics input panel is displaced; and converting the total movement value into a travel distance of said graphics input panel, the travel distance corresponding to the input width of said input area.

19. The method for maximizing a size of a graphic of claim 16, further comprising the steps of:

setting an input length of the drawing area;

determining a second drawing area coefficient based on the input width and the input length; and modifying the drawing coordinates of the graphic input within said input area based on the second drawing coefficient to generate the tape coordinates for printing the graphic on the elongated tape.

20. The method for maximizing a size of a graphic of claim 16, further comprising the step of printing the graphic input into the drawing area onto the elongated tape.

21. The method for maximizing a size of a graphic of claim 16, further comprising the step of determining a drawing area coefficient based on the input width and the tape width, wherein the step of modifying the drawing coordinates of the graphic comprises modifying the drawing coordinates based on the drawing area coefficient to generate the tape coordinates.

* * * * *